April 12, 1932.   J. L. KILCHENSTEIN   1,853,768
AUTOMATIC LENGTH ADJUSTMENT OF POWER TRANSMITTING
MEMBERS TO COMPENSATE FOR TEMPERATURE CHANGES
Filed Oct. 9, 1928   2 Sheets-Sheet 2
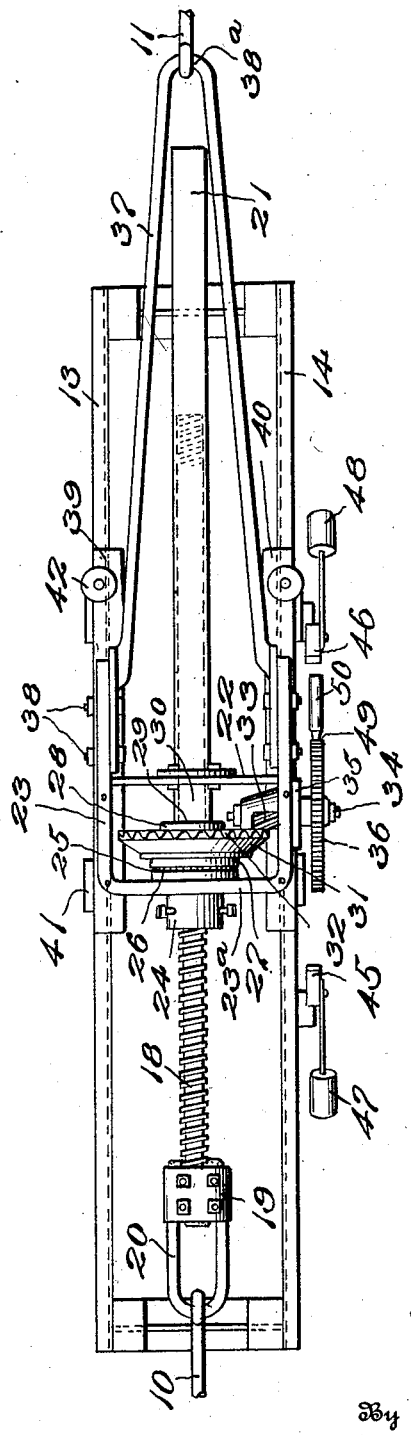
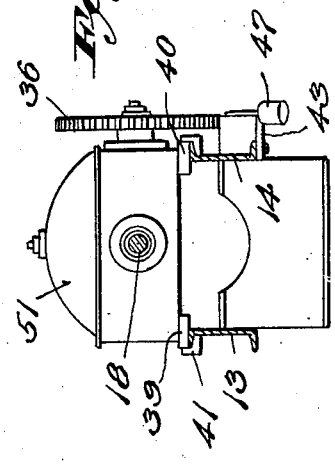
Inventor
JOSEPH L. KILCHENSTEIN,
By Steward & McKay
his Attorneys Patented Apr. 12, 1932

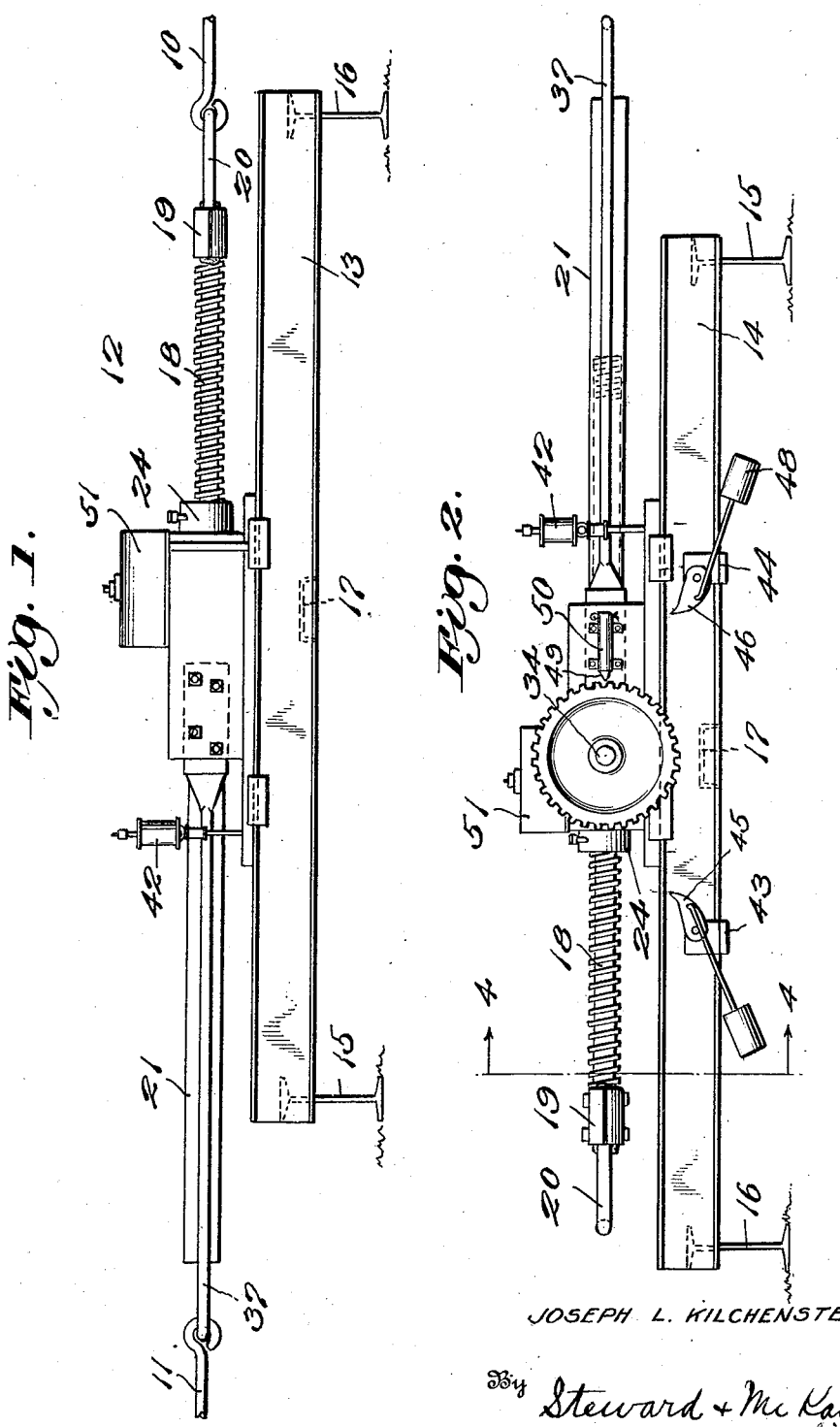

1,853,768

UNITED STATES PATENT OFFICE

JOSEPH L. KILCHENSTEIN, OF DALLAS, TEXAS, ASSIGNOR TO MAGNOLIA PETROLEUM COMPANY, OF DALLAS, TEXAS, A CORPORATION OF TEXAS

AUTOMATIC LENGTH ADJUSTMENT OF POWER TRANSMITTING MEMBERS TO COMPENSATE FOR TEMPERATURE CHANGES

Application filed October 9, 1928. Serial No. 311,314.

This invention relates to automatic length adjustment of power transmitting members to compensate for temperature changes; and particularly to means for the automatic adjustment of a reciprocating pull rod line of an oil-pumping system to maintain the effective length of said rod line substantially constant notwithstanding temperature changes.

In pumping systems for oil wells it frequently happens that several wells are pumped from one power plant and that the distance of the well from the power plant will be as great a distance as a mile, necessitating the use of iron pull rods from the well to the power plant, which rods must work freely and, therefore, lie upon the surface of the ground, exposed to the heat and cold. In warm or hot weather the heat causes the iron rods to expand and the expansion over a great distance will be of such significance that unless the excess in the length of the line is taken up, the pumping will not be successful. On the other hand during a change in temperature from hot to cold, the cold will cause the line to contract and the contracting in such a line over a considerable distance will, unless the line is let out, result in a considerable damage to the pump and sometimes injury to the machinery itself. It has frequently happened in such cases that the rod transmitting the power will pull the pump jack entirely loose from its footings. According to this invention the rod line is automatically kept at its proper length to ensure under all conditions of temperature an even and uniform pumping stroke and thus obviate such difficulties.

In accordance with this invention the rod line extending from the power plant to the well is provided with adjusting means for automatically increasing or diminishing the length of the rod at such times as the rod may contract due to cold or expand due to heat. In general, the adjusting means may be of any appropriate mechanical construction operable either to move toward or away from each other component parts or sections of the rod-line according as the tendency of the line is to lengthen or shorten from a given normal or mean length. Said adjusting means, which may take the form of an automatically adjustable coupling member between sections of the rod line, is arranged to remain idle as long as normal conditions prevail but to be put into operation as soon as the rod line exhibits any substantial tendency to change in length and to continue in operation as long as such tendency manifests itself. Actuating means for effecting such operation of the adjusting means may also vary widely in form within the scope of the invention but should be of such character and arrangement as to become operative upon a shifting of the limits of the path of reciprocating movement described by a given point in the rod-line.

In a typical practical embodiment of the invention as applied to a pull-rod line of an oil well pumping system, the length-adjusting means most desirably comprises a turnbuckle device connected in and virtually forming a part of the rod line and operable under proper conditions to effect a compensating increase or decrease in the length of the rod line, the turnbuckle device carrying rotatable operating means which, upon variation from normal in the rod line length, is adapted to be engaged by one or the other of two actuators positioned at the opposite ends or limits of the reciprocatory stroke of the turnbuckle device when the rod line is of its intended normal length. One of said actuators is effective for increasing the length of the rod and the other for decreasing its length. Further features and objects of the invention will appear in connection with the accompanying description and claims.

The accompanying drawings show a practical embodiment of the invention in which

Fig. 1 is a side elevation of a rod line adjuster in accordance with this invention;

Fig. 2 is a similar elevation of the other side thereof;

Fig. 3 is a plan view of the rod adjuster with its cover member removed; and

Fig. 4 is an end view of the adjuster showing the rod in section, the section being taken on line 4—4 of Fig. 2.

Referring to the drawings, 10 and 11 are sections of a rod line providing a driving connection between a power plant and an oil well pump (not shown), section 10 going to the power plant and section 11 to the pump. The sections are connected to each other by means of a turnbuckle device generally designated by the numeral 12, which reciprocates with the rod line and is slidable longitudinally upon bearing or guide rails 13 and 14 arranged parallel with the path of the rod movement. These guide rails are preferably channel bars welded or otherwise secured to supporting I-beams 15 and 16 at their ends and a reinforcing bar 17 midway of their lengths.

The turnbuckle device 12 consists of a long screw 18 secured by means of a clamp 19 and link connection 20 with the rod line 10 extending to the power plant. This screw 18 telescopes within a tube 21 secured to a transverse bracket 22, which latter at its ends is secured to a U-shaped frame 23 constituting a carriage to support the turnbuckle mechanism, said carriage being suitably supported for longitudinal sliding movement upon the supporting guide rails 13 and 14. The crosspiece 23ª of said frame member is apertured in line with the tubular member 21 and provided with a collar 24 fixedly secured therein through which the screw 18 may be moved. The inner portion of the collar is provided with a flange 25, the end surface of which is grooved to receive ball bearings 26 between it and a similarly grooved collar member 27 secured to and rotatable with a nut 28 which is threaded upon screw 18. The rear surface 29 of nut 28 bears against a collar or spacer member 30 between it and the transverse bracket 22. The nut 28 carries fixed thereto a ring gear 31 having teeth 32 engaged by a driving pinion 33 mounted on a stub shaft 34 extending laterally outwardly through a bearing member 35 provided in one side of the carriage 23. This shaft 34 also carries a ratchet wheel 36 for turning it and pinion 33, and thereby also turning gear 31 and nut 28 on screw 18. Instead of employing this type of gearing for driving the nut 28, it is feasible to use a worm drive, for example.

The carriage 23 is provided with a yoke-like connecting member 37 secured thereto preferably by means of bolts 38 so that it will extend around the end of tube 21 and provide connecting means at 38ª for the rod line section 11 extending to the pump.

Carriage 23 has secured thereto a pair of longitudinal slide members or bearing shoes 39 and 40 which support the carriage and bear directly upon the guide rails 13 and 14. Fastened to the outer side of each of these bearing shoes 39 and 40 are L-shaped guide pieces 41 cooperating with the guide rails 13 and 14 to keep the carriage for the turnbuckle device on the rails. Each of the bearing shoes is provided with a lubricator 42 in the form of an oil cup for lubricating the rails.

On the lower portion of the channel member constituting rail 14 are secured a pair of supports 43 and 44. These supports carry pivotally mounted pawls 45 and 46 respectively and they are positioned on the rail in such a spaced relation that the ratchet wheel 36 will not be engaged by these pawls except when a temperature change causes the sucker rod line to lengthen or shorten and thereby to bodily shift in one direction or the other the limits between which the carriage 23 moves in reciprocating with the rod line. Pawls 45 and 46 are provided with weights 47 and 48 respectively for normally holding them in a position for one or the other, when such bodily shift occurs, to engage the ratchet wheel 36 and to turn it as it passes over them,—each in one direction only,—the pawls being yieldable so as not to rotate the ratchet wheel on the reverse longitudinal reciprocating movement of the turnbuckle. A spring pressed bolt 49 mounted in a casing 50 secured to a side of the frame 23 operatively engages the ratchet wheel to prevent the wheel from turning during its return movement as it passes backward over the pawl and is thereby effective to hold the ratchet wheel in an adjusted position.

A cover member 51 is secured to the upper portion of the carriage 23 so as to enclose the gears and bearing members to keep sand and other foreign matter out of the bearings.

In operation the rod line is reciprocated through strokes of predetermined length at the power plant and thereby reciprocates the carriage carrying the turnbuckle device along the guide rails 13 and 14. So long as there is no change in temperature to disturb the normal or mean position of the reciprocation limits of the carriage for which the parts were originally adjusted, the turnbuckle device is not actuated and remains idle. In the event that the rod line should be expanded or contracted by changes in temperature, however, the ratchet wheel 36 will engage one or the other of the pawls 45 or 46 at one end of its stroke as a result of the bodily shift of the carriage reciprocation limits through the resultant change in length of the rod line.

Assuming that the rod is expanding due to an increase in temperature and that this shifts the reciprocation limits toward the right (Figs. 2 and 3), the path of movement of the turnbuckle 23 will be advanced along the guide rails 13 and 14 so that the ratchet wheel 36 near the end of a stroke toward the right will engage and pass over pawl 46 and in so doing pawl 46 will give this wheel a portion of a turn in a clockwise direction, as viewed in Figure 2, thereby turning nut 28 in the same direction, as viewed from the right in Fig. 3, and moving the nut along the screw 18 so as to contract the length of the rod line. Upon the return stroke (to the left), the ratchet wheel being held by the yieldable bolt 49, the tooth of pawl 46 will be forced downwardly around its pivot raising its weight 48 which normally holds it in its effective position for turning the ratchet wheel. Continuing its return stroke to the left, the ratchet wheel 36 approaches pawl 45 but may not be engaged or turned thereby. Upon the next stroke to the right, pawl 46 is effective to turn the ratchet wheel again if further shortening of the rod is required to restore the reciprocation limits to normal or mean position, and this operation is repeated until the rod ceases to expand and is adjusted to the length required. When the temperature decreases and a contraction of the rod line occurs, pawl 45 is effective in a similar manner to rotate the ratchet wheel in the opposite direction, and thus during variations in temperature the length of the rod line will be maintained substantially constant thereby preventing such change in length of the rod line as would cause injury to the pumping machinery.

The arrangement hereinbefore set forth is effective to maintain the length of the pull rod line substantially constant irrespective of temperature changes and thus to overcome the difficulties heretofore encountered in the operation of such systems. The principles of the invention may of course be embodied in combinations of automatic length-adjusting means with any type of driving or power-transmitting elements subject to undesirable changes in length through temperature variations, and accordingly the invention, although of particularly great utility in the specific field hereinabove referred to by way of illustrative example, is to be understood as of broad scope both as regards applicability and mechanical form which latter may vary widely from that herein specifically shown and described.

What is claimed is:

1. In power-transmitting mechanism, the combination, with a rod line connecting a driving member with a driven member, of a coupling member in said rod line adjustable to vary the length thereof, and means for operating on said coupling member to automatically adjust the rod line to a constant length to compensate for longitudinal expansion or contraction of the rod line due to temperature changes.

2. In power-transmitting mechanism, the combination with a longitudinally reciprocatory rod line of a coupling member in said rod line adjustable to vary the length thereof, and means for operating on said coupling member to automatically adjust the rod line to a predetermined length when the temperature tends to change the length thereof.

3. The combination, with a reciprocatory power-transmitting rod line, one end of which is for connection with a power plant and the other end with a power-translating device, of a rod line adjuster operative to keep the limits of the stroke at the power translating device end of the rod line uniform, and means for actuating said adjuster when said stroke tends to vary.

4. The combination, with a reciprocatory power-transmitting rod line, one end of which is for connection with a power plant and the other end with a power translating device, of a rod line adjuster connected in the rod line to reciprocate therewith and means adapted to be engaged by the adjuster at the end of the power transmitting strokes effective to actuate the adjuster in the event that the limits of the reciprocatory stroke of the rod line at the translating device end thereof should be advanced forwardly or backwardly from that of the uniform stroke.

5. The combination with a divided rod connection between a source of power and a driven part, of actuating means for causing relative approach or retraction of adjacent opposed ends of the driving connection, and means for setting said actuating means into operation upon linear movement of the rod connection beyond its normal limits due to expansion or contraction by reason of temperature changes.

6. The combination with a divided rod connection between a source of power and a driven part, of geared actuating means for causing relative approach or retraction of adjacent opposed ends of the driving connection, spaced pawls adjacent said geared actuating means, said actuating means being engageable by said pawls to set the same into operation upon linear movement of the rod connection itself due to expansion or contraction by reason of temperature changes.

7. An automatic rod line adjuster comprising a screw and gear mechanism interposed in the rod line, and means cooperating with said gearing upon the expanding or contracting of said line due to heat or cold to cause said screw and gearing to take up or let out on said line to cause said line to operate within its proper stroke limits.

8. The combination, with a longitudinally reciprocatory rod including a plurality of rod sections and a coupling member adjustable to vary the length of the rod, of means for automatically operating on the coupling member to change the relation of the rod sections to each other to compensate for variations in the length of the rod.

9. The combination, with a reciprocatory power-transmitting rod consisting of a plurality of sections, of a coupling member between sections of the rod reciprocatory therewith and adjustable to change the length of the rod, and means adapted upon change in the rod length to cooperate with the coupling member at either end of its reciprocatory stroke for automatically adjusting the length of the rod.

10. The combination, with a reciprocatory power-transmitting rod including a pair of rod sections connecting a power plant and a power translating device, of a coupling member between the rod sections adjustable to change the length of the rod, and means adapted to cooperate with said coupling member at either end of its reciprocatory stroke to maintain constant the limits of movement of the end of the rod connected with the power translating device irrespective of changes in length of the rod, whereby the normal operation of the power-translating device may be maintained without danger of damage as a result of changes in length of the rod or resultant changes in position of the end of the rod connected with such power translating device which might otherwise occur.

11. In apparatus of the character described the combination, with a power plant, a power-translating device, and a reciprocatory rod-line comprising a plurality of sections operatively connecting the two, of a turnbuckle device adjustably coupling two sections of said rod line and reciprocable therewith, and actuating means positioned adjacent the normal limits of the turnbuckle device stroke and cooperating with said turnbuckle device to effect compensating adjustment of the rod line length whenever such length varies and thereby shifts said normal limits of stroke.

12. An adjuster for a reciprocatory power-transmitting rod line including a plurality of rod sections comprising, in combination, a turnbuckle device for connection between sections of the rod line to be reciprocated thereby, said turnbuckle device including a screw for connection with one section of the rod and a rotatable nut and means for connecting the same with an adjoining section of rod, rotatable driving means carried by the turnbuckle device for turning the rotatable nut on the screw, and actuating means adapted to engage said rotatable means at either end of the reciprocatory movement of the turnbuckle for changing the position of the nut of the screw and thereby adjust the length of the line.

13. An automatic rod line adjuster including a track, a frame slidably mounted on said track, a screw and gear mechanism carried on said frame, a rod line connected at one end of the screw and to the frame, and pivoted pawls on said track adapted to be engaged by said gearing upon expansion or contraction of the rod line, to automatically cause said screw and gearing to take up or let out the rod line and thereby to cause said line to operate within its proper stroke limits under all conditions of temperature.

14. An automatic rod line adjuster including a track, a frame slidably mounted on said track, a screw and cooperating nut and gearing carried by said frame, means whereby a rod line may be connected to one end of said screw and to said frame, and actuating means mounted on said track engageable with said gearing upon expansion or contraction of such rod line due to heat or cold to automatically cause said screw, nut and gearing to take up or let out the rod line.

15. An adjuster for a reciprocatory power-transmitting rod line including a reciprocatory carriage, a screw supported thereby and movable longitudinally thereof, a nut threaded on said screw and rotatably supported in said carriage, said screw and nut adapted respectively for connection to rod line sections to be adjustably coupled thereby, rotatable driving means mounted on the carriage for turning said nut on said screw, and means in the path of movement of the said rotatable means to be engaged at either end of the reciprocatory movement thereof for turning said rotatable means to adjust the nut along said screw.

16. An adjuster according to claim 15, including guide rails parallel with the path of the rod line, along which the carriage reciprocates.

17. An automatic rod line adjuster for pumps including a track, a frame slidably mounted on said track, a screw and cooperating nut and gearing carried by said frame, means whereby a rod line may be connected to one end of said screw and to said frame, and pivoted pawls mounted on said track engageable with said gearing upon expansion or contraction of such rod line due to heat or cold to automatically cause said screw, nut and gearing to take up or let out the rod line to insure the pump stroke being within its proper limits under all conditions of temperature.

18. An adjuster for a reciprocatory power-transmitting rod line including a carriage, guide rails along which said carriage reciprocates, a screw supported by the carriage and movable longitudinally thereof, a nut threaded on said screw and rotatably supported in said carriage, operating means mounted on the carriage for turning said nut on said screw including a ratchet wheel having its shaft extending transversely of the screw, and a pair of actuating pawls pivotally carried by one of the guide rails in the path of the reciprocatory movement of said ratchet wheel, one at either end of the normal reciprocatory stroke thereof for engaging the ratchet wheel and turning it, one pawl in one direction and the other pawl in the other direction, whereby the position of the nut is changed along the screw in the event that the limits of reciprocatory movement of the carriage along said rails are shifted toward one end or the other thereof.

19. The combination, with a reciprocatory power transmitting rod line consisting of a plurality of sections, of a coupling member between sections of the rod line reciprocatory therewith and adjustable to change the length of the rod line, and means adapted upon change in the rod line length to cooperate with the coupling member during its reciprocatory stroke in one direction or the other according as to whether the length of the line is to be increased or decreased for automatically adjusting the length of the rod line.

20. The combination, with a reciprocatory power transmitting member, one end of which is for connection with a power plant and the other with a power-transmitting device, of coupling means operative to adjust the length of said member to prevent the strokes at the power-translating device end of the member from advancing forwardly or rearwardly beyond predetermined limits, and means for automatically adjusting said coupling means.

In testimony whereof I hereunto affix my signature.

JOSEPH L. KILCHENSTEIN.